(12) United States Patent
Mutyala et al.

(10) Patent No.: US 10,686,931 B1
(45) Date of Patent: Jun. 16, 2020

(54) SMARTPHONE MESSAGING APPS INTERACTION WITH AIRPORT SMART ARTIFICIAL INTELLIGENCE

(71) Applicant: NCR Corporation, Atlanta, GA (US)

(72) Inventors: Sunny Kumar Mutyala, Hyderabad (IN); Aghamarshana Kaushik Pillalamarri, Hyderabad (IN)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/209,121

(22) Filed: Dec. 4, 2018

(51) Int. Cl.
 *H04W 4/021* (2018.01)
 *H04M 1/725* (2006.01)
 *H04L 29/08* (2006.01)
 *H04L 12/58* (2006.01)

(52) U.S. Cl.
 CPC ...... *H04M 1/72572* (2013.01); *H04L 51/046* (2013.01); *H04L 67/125* (2013.01); *H04W 4/021* (2013.01)

(58) Field of Classification Search
 CPC ..... H04W 4/021; H04W 4/023; H04W 4/024; H04W 4/025; H04W 4/029; H04W 4/08; H04W 4/21; H04W 4/50; H04W 4/70; H04W 4/12; H04W 12/08
 See application file for complete search history.

(56) References Cited

U.S. PATENT DOCUMENTS

| | | | | |
|---|---|---|---|---|
| 2002/0073235 | A1* | 6/2002 | Chen | H04L 29/06 709/246 |
| 2010/0190510 | A1* | 7/2010 | Maranhas | G06Q 10/02 455/456.1 |
| 2013/0325797 | A1* | 12/2013 | Woods | H04L 67/28 707/609 |
| 2014/0195664 | A1* | 7/2014 | Rahnama | H04W 4/70 709/223 |
| 2015/0187232 | A1* | 7/2015 | Bailiang | G09B 29/007 701/532 |
| 2017/0140174 | A1* | 5/2017 | Lacey | G06F 21/6245 |
| 2017/0178086 | A1* | 6/2017 | Dave | G08B 21/24 |
| 2017/0330074 | A1* | 11/2017 | Martino | G06N 3/08 |
| 2018/0039952 | A1* | 2/2018 | Dintenfass | H04L 67/10 |
| 2018/0211187 | A1* | 7/2018 | Chen | G06Q 50/30 |
| 2019/0014440 | A1* | 1/2019 | Vega | G01S 19/16 |
| 2020/0053099 | A1* | 2/2020 | Day, II | H04L 67/22 |

* cited by examiner

*Primary Examiner* — Jean A Gelin
(74) *Attorney, Agent, or Firm* — Schwegman, Lundberg & Woessner, P.A.

(57) ABSTRACT

A passenger terminal AI system automatically connects with messaging apps on passenger smartphones over a wireless network when passengers enter the terminal. This creates a communication link between the server and each smartphone. When the passenger enters the terminal, the AI system identifies the passenger by facial recognition software or by tracked passenger transactions at the terminal, providing passenger identity. Passenger browser history information and travel information is retrieved from the smartphone. Passenger location is identified and tracked. The server provides the passenger's smart phone, via the messaging app, with 100 personalized messages related to possible purchase by the passenger of travel and other services, located in the terminal and elsewhere, based in part on the retrieved information. The server provides the passenger with terminal schedule and gate information, and also operates with service providers to meet the passenger's desired services.

20 Claims, 4 Drawing Sheets

SMARTPHONE MESSAGING APPS INTERACTION WITH AIRPORT SMART ARTIFICIAL INTELLIGENCE

BACKGROUND

Smart Artificial Intelligence (AI) systems are installed at various types of locations where people gather for a specific purpose. One example is passenger terminals such as airports, where airport smart AI systems such as question and answer systems or chatbot systems, among others, can communicate with and provide personalized server-controlled messages/photos/maps and other chat and data to a user's smartphone messaging apps such as Whatsap™, Instagram™, WeChat™, Viber™, and others. Messaging apps of this type provide cross-platform, server-controlled, services such as voice over IP (VoIP) service, and the sending and receiving of text messages, chats, images, videos, voice calls, video calls, documents, user location and other data. Airports are one example of such locations, but there are many other types of locations such as train stations, cruise line departure points, bus stations, shopping malls, and other locations where many persons with smartphones congregate.

Recent statistics show that messaging apps have on the order of two billion users. This user base is exchanging billions of messages on a daily basis. This represents an enormous amount of user data that can be used to provide services and guidance, especially to airline passengers and other travelers, and thereby enhance travel experience, shopping experience and other experience, both in a departing terminal, and at a destination.

SUMMARY

In various embodiments, methods and a system for user-voluntary, server-controlled interaction between user smartphone messaging apps and an airport smart AI server, in real time, are disclosed.

Airport passengers using smartphones, as one example, will usually have one or more instant messaging apps or photo sharing apps installed on their phones. Interaction between an airport AI system and passengers' messaging apps can create opportunities as well as a seamless experience for both airports and passengers. Interaction can be in the form of messages or photos or even phone calls. Specifically, and in an example embodiment, an airport smart AI system may, with passenger consent, automatically connect with passengers' smartphones when the passengers enter airports, and the airport AI system can create a communication link with each individual passenger, via any of the above messaging apps, thereby enabling the AI system to communicate with the passenger. In an example embodiment, when the passenger enters the airport, the AI system may identify the passenger by, for example, facial recognition software via airport cameras, or by the passenger performing airport transactions such as printing a boarding pass or making a purchase at an airport point-of-sale (POS) terminal, all of which transactions are stored in the smartphone's browser history. The passenger may also be identified by searching for the passenger's smartphone number if the passenger has given his or her smartphone number when, say, purchasing tickets or has provided it for any other airport service. Passenger location can be identified in one embodiment by camera location or, in another embodiment by location of the above POS terminal. Passenger movement can then be tracked by the global position system (GPS), as only one example of a tracking system. Next, the airport AI server that controls interacting with the passenger can provide the passenger, via a messaging app on passenger's smartphone, personalized messages related to travel and other services, located both in the airport and elsewhere to enrich the travel experience by making purchasing and reservation transactions easier and less time consuming. The messages may relate strictly to travel experiences, like places of interest at a destination, or purchase and reservation experiences, either at the airport or at the passenger's destination. This will save the passenger time by removing, or substantially lowering, time spent standing in line, among other savings.

DETAILED DESCRIPTION

Figure 1:
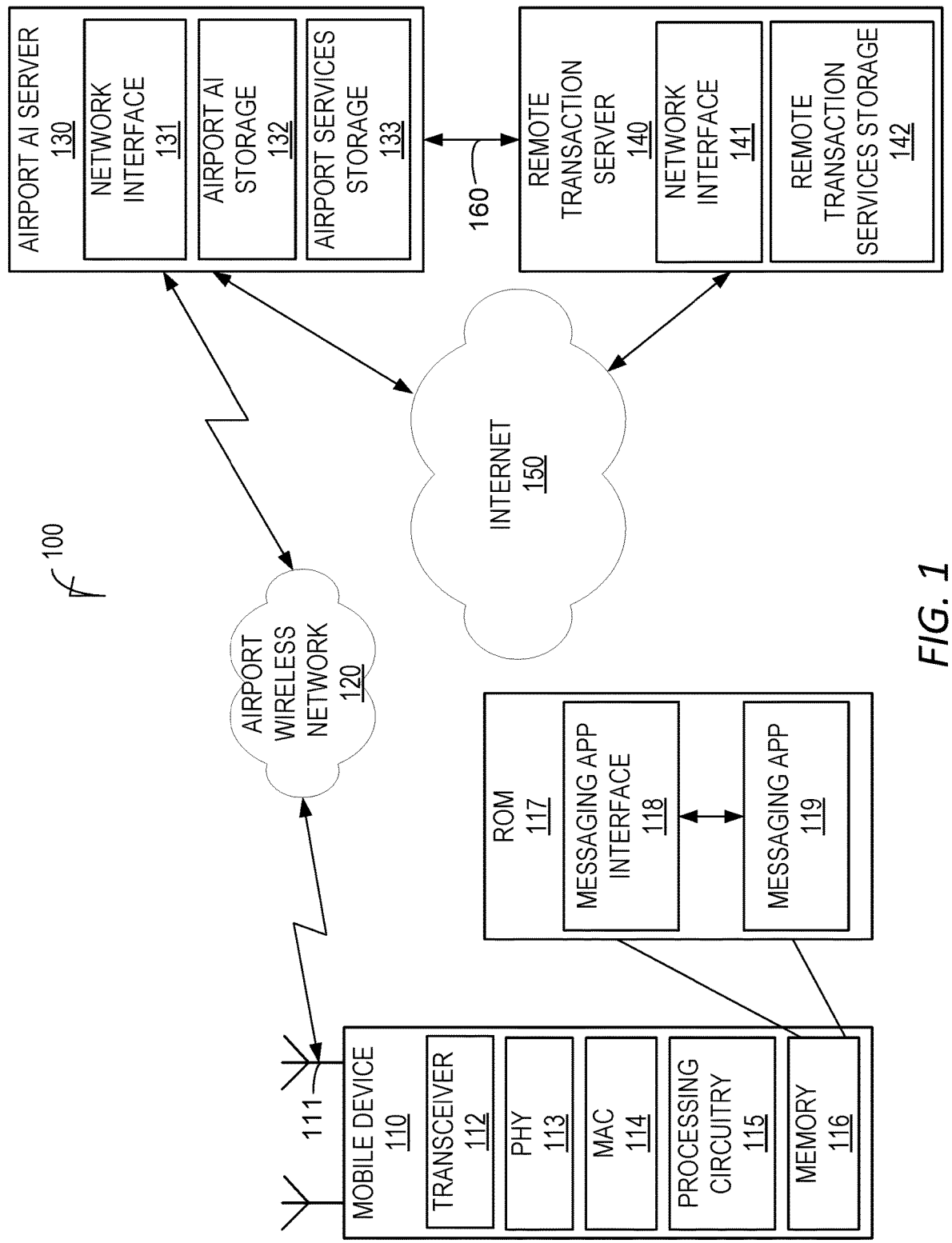
FIG. 1 is a diagram of a system for providing relevant information to smartphone users via interaction between passenger smartphone messaging apps and an airport AI server, according to an example embodiment.

FIG. 1 is a diagram of a system 100 for providing relevant information to smartphone users via Interaction with passenger smartphone messaging apps and an airport AI server, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of providing relevant information to smartphone users via Interaction with passenger smartphone messaging apps and an airport AI server, presented herein and below.

Further still, while the disclosure herein is described in terms of airports, the described systems and methods may be used in many other types of locations such as train stations, cruise line departure points, bus stations, shopping malls, and other locations where many persons with smartphones congregate.

The system 100 includes a mobile device 110. Mobile device 110 may be a smartphone or other suitable user-operated equipment. While mobile device 110 will be referred to herein as a smartphone, mobile device 110 may be a personal computer (PC) such as a laptop PC, a tablet PC, a personal digital assistant (PDA), a mobile web appliance, or any mobile machine capable of executing instructions (sequential or otherwise) that specify actions to be taken by that machine. The smartphone 110 includes: one or more transmit/receive elements, such as antennas 111, for wireless transmission of radio signals, a transceiver 112, physical (PHY) circuitry 113, media access control (MAC) circuitry 114, processing circuitry 115 and memory 116. Transceiver 112 may transmit and receive data as data packets. MAC circuitry 114 may be arranged to configure data packets such as a physical layer convergence procedure (PLCP) protocol data unit (PPDUs) and also arranged to transmit and receive PPDUs, among other things. The PHY circuitry 113 may include circuitry for modulation/demodulation, upconversion/downconversion, filtering, amplification, and other radio functions, and may be arranged to transmit the PPDU. The processing circuitry 115 may include a processor such as a general purpose processor or special purpose processor. The processing circuitry 115 may implement one or more functions associated with transmit/receive elements 111, the transceiver 112, the PHY circuitry 113, the MAC circuitry 114, and/or the memory 116. While FIG. 1 illustrates processing circuitry 115 and transceiver 112 as separate components, they may be integrated together in an electronic package or chip. Memory 116 may include the messaging apps discussed above, in a read-only-memory (ROM) part of the memory such as ROM 117. The messaging app 119 in an example embodiment may be stored in the user data partition of ROM 117. The messaging app 119 connects to other parts of smartphone 110, via a messaging app interface 118 which may be part of the messaging app 119 itself. Connection may be made to processing circuitry 115 or to MAC 114 where messages to and from the messaging app may be configured into packets for transmission and reception from and to the smartphone 110.

The system 100 also includes an airport AI server 130. The airport AI server includes network interface 131, airport AI storage 132 and airport services storage 133. Airport AI storage 132 may include a secured database of smartphone 110 information, identified as to each smartphone in the system, as discussed below. Airport services storage 133 may store information about a variety of airport services and functions by airport service entities within the airport, such as restaurants, fast food locations, coffee services, general shopping services, disabled passenger service, and other services available in the airport, and in some embodiments reviews about the services collected from other passengers. Airport services storage 133 may also store up-to-the-minute airline information about airlines, flight numbers, departure times, arrival times, gate numbers, and the like. In an example embodiment, the airport services locations such as terminals, gates, restaurants and personal service locations may be stored in a grid layout of the airport. In an example embodiment, airport AI storage 132 operates in conjunction with airport services storage 133 to provide the appropriate products and services information to the identified smartphone 110. Although not shown, airport AI server 130 also includes radio transmit/receive components similar to those discussed with respect to mobile device 110. Network interface 131 connects the airport AI server 130 to a plurality of passenger-operated mobile devices 110 (only one such device being illustrated) in the airport via a local area network such as airport wireless network 120 which, in an example embodiment, may be a Wi-Fi network. The network interface 131 may include an application program interface (API) that serves as a portal to and from software applications in the airport AI server 130 for airport wireless network 120. Airport wireless network 120 connects to a plurality of passenger smartphones and other user-operated mobile devices 110 on the airport premises via transmit/receive antennas 111. In an example embodiment, there may be thousands of smartphones active at a given airport at any given time. Network interface 131 may also be configured to communicate with remote transaction server 140 via a wireless network 150 or via a wired connection 160, as discussed in detail below. AI server 130 may poll the smartphones, also as discussed in additional detail below, to determine when a user of a smartphone desires to send information to the AI server via the messaging app 119.

The system 100 may further include one or more remote transaction servers 140 connected to airport AI server 130 via the Internet 150 or other suitable network. A remote transaction server 140 may, in an embodiment, be associated with a remote business such as a restaurant or hotel that may offer remote services for a traveler, or with a venue ticket sales entity, remote from the airport, e.g., at the passenger's destination. In an embodiment, a passenger may, via the messaging app 119 and responsive to polling by the AI server 130, provide AI server with 130 information that the passenger desires information about restaurants or venues and events at the passenger's destination. The AI server 130 may, in one embodiment, interact with remote transaction server 140, as discussed below, and provide the smartphone with a list of best restaurants at the destination including reviews and ratings. Similarly, messages from AI server 130 can be related to venues, events, local cuisines, and shopping spots based on the passenger's destination. The AI server can also message photos of locations, maps, special cuisine photos in restaurants, and similar information to provide more details to the passenger. The AI server 130 can also provide reviews and feedback collected from other passengers about remote businesses, venues and events.

In an example embodiment, remote transaction server 140 may be operated by a business separate from the airport. In an example embodiment, a plurality of remote transaction servers 140 may be operated by a remote server aggregator that is separate from the airport and aggregates a plurality of remote transaction servers. In an example embodiment, remote transaction server 140 may be operated by a remote server aggregator that is located at the airport and coupled to the airport AI server 110 via cabling 160. In an example embodiment, the remote transaction server 140 or remote server aggregator may be part of airport AI server 130.

The remote transaction server 140 includes radio transmit/receive components similar to those discussed with respect to mobile device 110. As discussed above, remote transaction server 140, when separate from the airport, may be connected to the airport AI server 130 via Internet 150 or other suitable network. The connection between Internet 150 and remote transaction server 140 may be made via network interface 141, which may include an API. Remote transaction server 140 is configured to offer to a user of smartphone 110 the ability to engage in various remote services at restaurants, hotels and other businesses located, for example, at the passenger's destination. The remote services may be based on the needs of the passenger and also on information retrieved from smartphone 110 via airport AI server 130. For example, the passenger may be asked, via the messaging app 119, whether the passenger needs a particular service based on retrieved information from the smartphone browser history that shows that the passenger prefers that particular type of service. The system 100 can be operated in a variety of manners as described herein and below.

In an example embodiment, when a passenger or other user enters an airport with a smartphone 110, the airport AI server 130 automatically connects, via network interface 131, with the smartphone 110 via a smartphone's messaging app 119, if permitted by the passenger. In an example embodiment, the passenger may be asked if he/she would consent to connect to the airport AI 130 and provide information, and if the passenger is over thirteen (13) years of age. If the passenger consents and is over 13 years of age, the passenger is also presented with a list of selectable consents of varying scope, such as agree to allow emails to be sent from retailers to the passenger, allow phone calls from retailers to the passenger, allow retailers to send text messages to the passenger, allow retailers to send postage mail to the passenger, connect to remove service websites, and the like.

Details such as product preferences of the passenger can be retrieved from the phone's browser history, which is stored for phone browsers like it is for a laptop or other computers. Such information can be used for providing products and services for the passenger as discussed below. The airport AI server 130 then stores the user's consent and the retrieved information in airport AI storage 132 within a passenger database. For protection, personal retrieved passenger information such as name, gender, age, address, phone number, airline, destination, flight number, and similar personal information, may be marked in the passenger database with a flag to protect its confidentiality and its access from other services.

Various identification schemes may be used to map the stored information to the appropriate mobile user device 110 or to the particular passenger. In one embodiment, a token is generated that uniquely represents a given smartphone. The preferences of the particular passenger can be updated each time the passenger enters the airport for different trips, since there will be additional phone browsing between trips and new information from the browsing history between trips can be used to update the user's database in airport AI server 131 when the passenger again enters the airport for a new trip.

The airport AI server 130 may then greet the passenger via the user's messaging app such as WhatsApp, and search the smartphone. The airport AI system 130 may then retrieve from the smartphone 110, via network interface 131, consented-to details such as passenger name, age, gender, street address, email address, smartphone number, airline, destination, flight number and similar information.

In an example embodiment, using the flight information provided by smartphone 110, airport AI server 130 may then send to the smartphone 110, via the messaging app for display, the flight time and gate number of the user's flight, based on information in airport AI storage 132 and airport services storage 133. Having flight and gate information on one's phone display would remove the requirement to spend time looking at the airport display upon entering the airport and tracking down the city, airline, flight, time, and gate number. Further, a grid of the airport, including grid coordinates and other airport markers, such as airline ticket counters or shops, may be stored in airport AI storage 132. The location of the smartphone 110 can also be tracked by a system such as the global positioning system (GPS). The smartphone location information and location motion information, for example by the GPS, combined with the airport grid information and markers, may be used to implement augmented reality to illustrate, on the display of smartphone 110, the direction to the user's gate. For example, an image of the smartphone 110's location in the airport may be sent to smartphone 110 for display by AI server 130, the server having used well known scaling technology to superimpose the grid of airport coordinates and other airport markers, discussed above, on the image of the airport. The resultant map of airport coordinates and airport markers can be used by AI server 130 to locate the passenger's gate by arrows and other indicators, in order to implement the augmentation.

In an example embodiment the airport AI server 130 may also ask the passenger, via messaging in the smartphone's messaging app 119, whether there are any airport services or remote services the passenger desires, transactional or otherwise. The passenger can, reply via the messaging app, that he or she needs, for example, to buy a book, or buy fast food at the airport. The airport AI server 130, using the airport grid information stored in airport services storage 133 and GPS location of the passenger, can reply with the direction to the nearest book store and the nearest fast food concession in the airport. In an example embodiment, the airport AI server 130 may make use of the in-app payment function available in messaging apps. For example, the airport AI server 130 asks the passenger, via the connection to the messenger app 119, what airport service the passenger may need. If the passenger replies with information that indicates that he or she wants to order fast food, the airport AI server 130 may provide the passenger, via the messaging app 119 of smartphone 110, information comprising a list of fast food restaurants available in the airport, using the airport services and grid information stored in airport services storage 133. In an example embodiment, the airport AI server 130 can use the fast food restaurant grid locations and other airport markers to identify the location of the fast food restaurants nearest the passenger by using augmented reality as discussed above. In an example embodiment the airport AI server 130 can inform the passenger of the fast food restaurants that are both near the passenger and near the airport gate from which the passenger is to depart. The passenger can select a fast food restaurant from the list and, via the messaging app 119 of smart phone 110, provide to the airport AI server 130, information comprising both the identity of the restaurant and the fast food desired. The airport AI server may total the price for the order. The passenger is notified of the price, which may comprise the AI server 130 providing the price via a graphical user interface for the in-app payment function of the messaging app 119. The passenger may then pay the price, via the in-app payment function of messaging app 119. The AI server 130 may then place the order to the fast food restaurant, selected by the passenger, via airport wireless network 120, or via another suitable connection, and the fast food restaurant readies the product of the order, e.g., the fast food. The fast food order will then be available for the passenger for pick-up when the passenger arrives at the fast food restaurant, without the passenger having to wait through the usual queue to place and receive the order. This is a particular time saver if a passenger is in a rush to be on time for a flight.

If the passenger replies that he or she would like to know about restaurants and hotels at the destination, the airport AI server 130 can query remote transaction server 140 and inform the smartphone 110, via messaging app 119, of names and ratings of restaurants and hotels at the destination. In an example embodiment, the airport AI server 130 can provide the passenger, via smartphone 110, with the ability to make a reservation at a restaurant or hotel selected by the passenger. The passenger can use the in-app payment function of the messaging to pay a deposit that may be needed for the hotel. Airport AI server 130 can interact with remote services server 140 as may be needed for the above reservation service. This interaction may be via either Internet 150 if the remote services server 140 is located remotely from the airport AI server, or via cabling 160 if the airport AI server 130 and remote services server 140 are located close to each other. These and other embodiments are now discussed with reference to the FIGS. 2-4.

Figure 2:
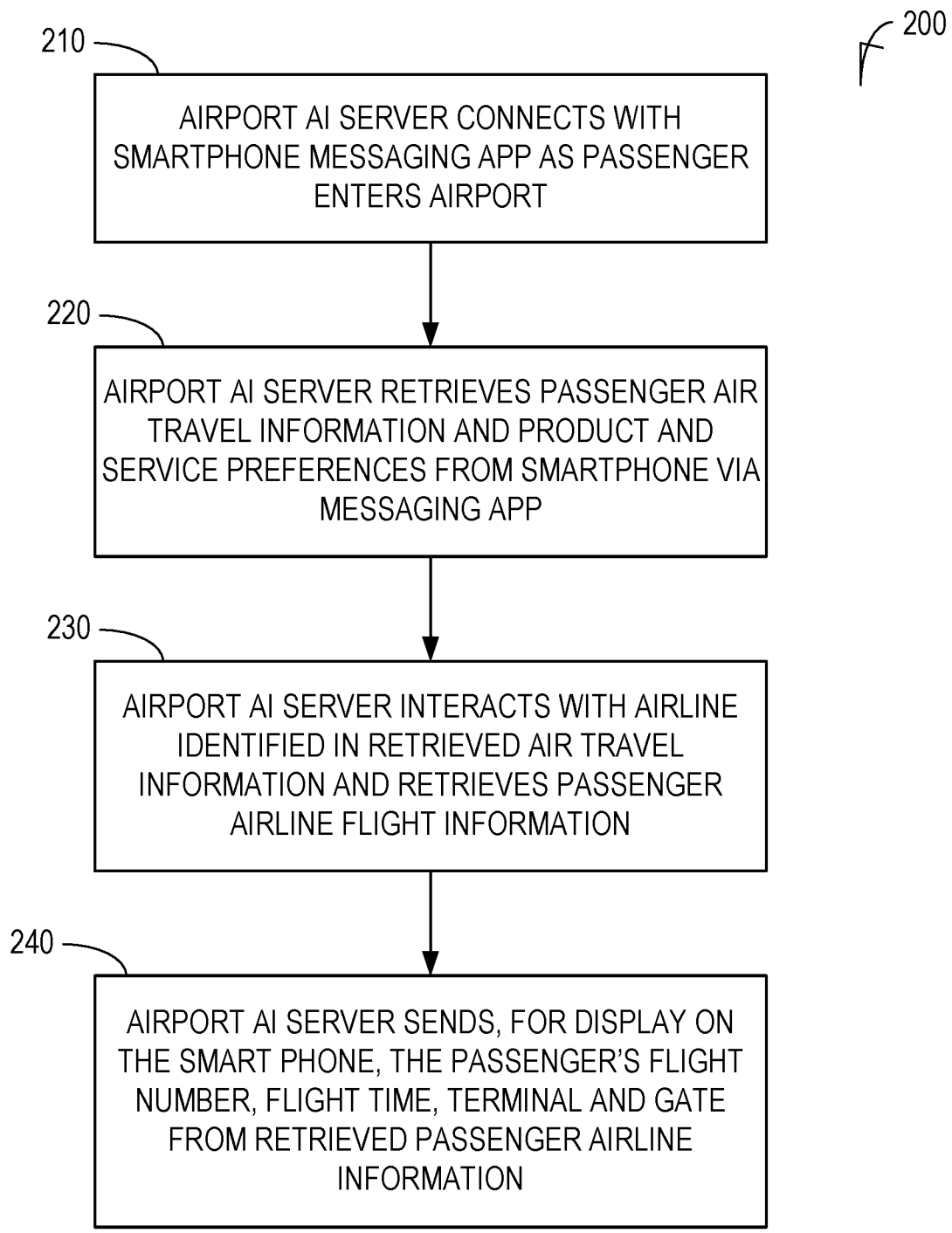
FIG. 2 is a diagram of a method for providing relevant information to smartphone users via interaction between passenger smartphone messaging apps and an airport AI server, according to an example embodiment.

FIG. 2 is a diagram of a method 200 for providing relevant information to smartphone users via interaction between passenger smartphone messaging apps and an airport AI server, according to an example embodiment. The software module(s) that implements the method 200 is referred to as a "retrieved information controller." The retrieved information controller is implemented as executable instructions programmed and residing within memory and/or a non-transitory computer-readable (processor-readable) storage medium and executed by one or more processors of a device or system. The processor(s) of the device or system that executes the retrieved information controller are specifically configured and programmed to process the retrieved information controller. The retrieved information controller may or may not have access to one or more network connections during its processing. The network connections can be wired, wireless, or a combination of wired and wireless.

In an embodiment, the device or system that executes the retrieved information controller is airport AI server 130.

In an embodiment, the device or system that executes the retrieved information controller is a logical collection of servers organized as a cloud.

In an embodiment, the retrieved information controller is the network interface 131, and the remote network interface 141.

The retrieved information controller has access and control over the database of airport AI storage that includes personal passenger information. In an embodiment, the airport AI storage is the airport AI storage 132.

At 210, when a passenger enters an airport with a smartphone 110, the airport AI server 130 automatically connects, via network interface 131, with the smartphone 110 via a messaging app 119 on the smartphone 110, if permitted by the passenger. In this regard, the passenger is asked at 220 whether he/she is over age 13 and consents to connecting to the airport AI server 130 and provide information to the airport AI server. If the passenger is over age 13 and consents, then at 230 the passenger smartphone 110 is connected to airport AI server 130. The airport AI server 130 retrieves passenger information from the passenger's smartphone 110. The information includes product and service preferences from the smartphone browsing history, the passenger's airline flight number, and other information stored on smartphone 110. Airport AI server 130 stores in airport AI stored 132, the passenger's consent and the retrieved passenger information from smartphone 110 via the retrieved information controller software module. At 240, the airport AI server 130 interacts with airport services storage 133 to determine airline information and transmits via the messaging app 119, for display on smartphone 110, the resultant passenger airline, flight number, flight time, terminal of departure and gate of departure.

Figure 3:
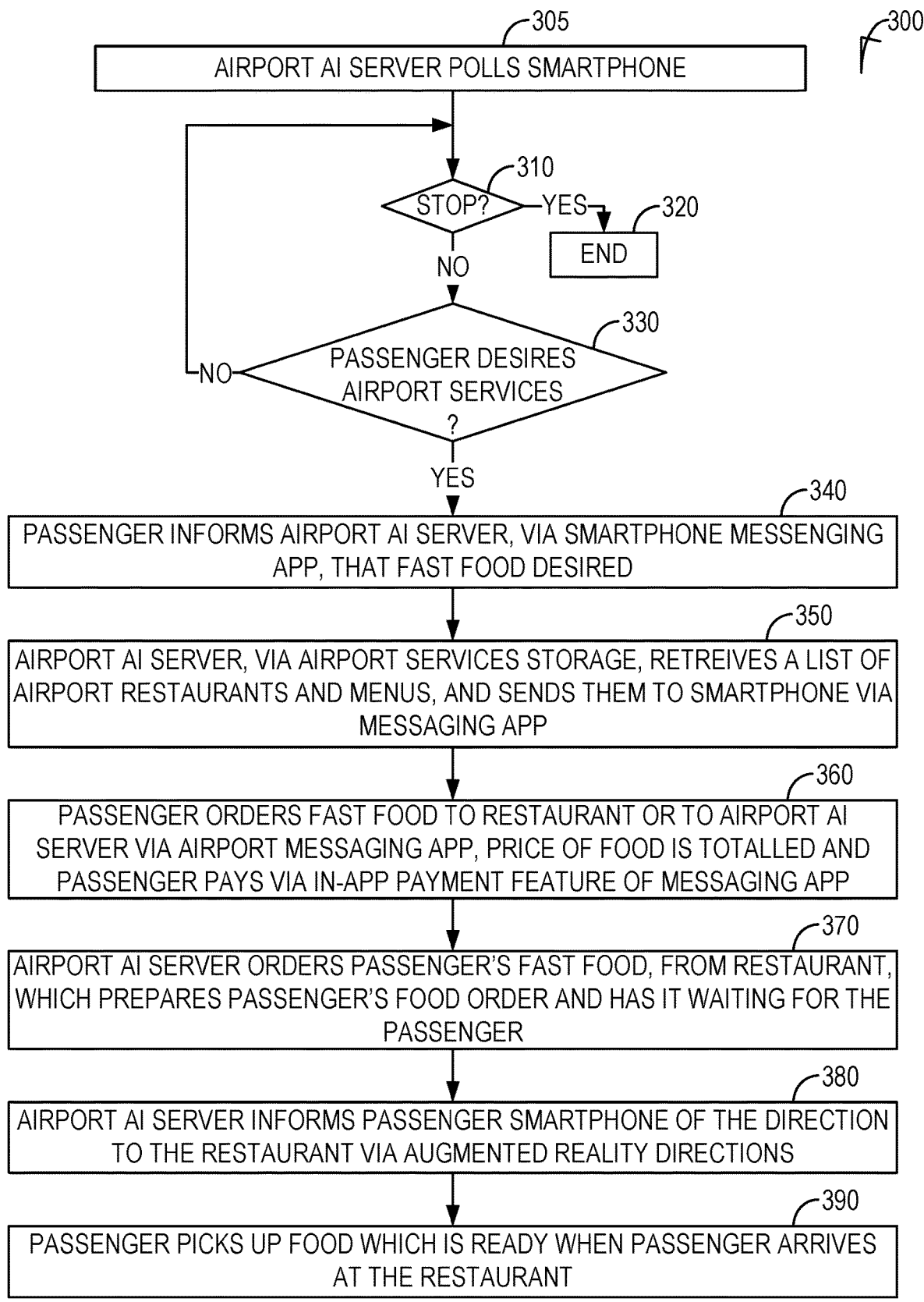
FIG. 3 is a diagram of another method for providing relevant information to smartphone users via interaction between passenger smartphone messaging apps and an airport AI server, according to an example embodiment.

FIG. 3 is a diagram of another method for providing relevant information to smartphone users via Interaction with passenger smartphone messaging apps and an airport AI server, according to an example embodiment. As with FIG. 2, the software module(s) that implements the method 300 is referred to as a "retrieved information controller." Again as with FIG. 2, the retrieved information controller is implemented as executable instructions programmed and residing within memory and/or a non-transitory computer-readable (processor-readable) storage medium and executed by one or more processors of a device or system. The retrieved information controller and the device or system that executes it operate as explained with respect to FIG. 2.

In an example embodiment, at 305 airport AI server 130 continually polls smartphone 110 via messaging app 119, according to some predetermined timing sequence. If at any time the passenger wants to retract consent and halt discourse with the airport AI server, the passenger can so indicate and the discourse will end. In an example embodiment, this is implemented by the polling 305 by asking at decision 310 whether the passenger wants to stop the conversation. The path through the decision point may be called the "stop loop." If the answer is YES, the process ends at 320. In example embodiments, the passenger is given the opportunity to stop or "opt-out" of the discourse at any point in the process. Therefore there may be a stop loop (not illustrated) after each step of the method, namely after 340, 350, 360, 370, 380. If the passenger answers YES at any stop loop decision point, the process ends. Stop loops may similarly be placed after each step of the method of FIG. 2 to afford the passenger the opportunity of opting out at any point in the method.

If the answer to the question at 310 is NO, the polling asks at 330 if the passenger desires airport services. If the answer to the question is currently NO, the process continues through the stop loop at 310. At some point in the polling 330, the passenger may answer YES, and at 340 the passenger, who may be a distance from a restaurant, informs the airport AI server 130, via the smartphone messaging app 119, that he or she wants to order fast food. For example, the passenger may send AI server 130 a message that communicates that the passenger would like to know about the restaurants at the airport. If the passenger communicated that he or she would like information about restaurants at the airport, for example for fast food, then at 350 the airport AI server queries airport services storage 130 and retrieves a list of airport fast food restaurants and menus, which it sends to smartphone 110 via the messaging app 119. At 360 the passenger communicates a fast food order to airport AI server 130. The airport AI server 130, via processing by the retrieved information controller, totals the price of the food sale. The passenger, may pay the total via an in-app payment function of the messaging app 119. At 370 the airport AI server 130 places the passenger's fast food order from the restaurant, which prepares the food order and has the order waiting for the passenger. At 380 the airport AI may provide the passenger smartphone direction to the restaurant, which in an embodiment, may use augmented reality to indicate the location of the restaurant. When the passenger arrives at the restaurant at 390, the food order is ready for the passenger, without the passenger having to wait in line to order the food. While this disclosure describes the passenger being provided the ability to interact with airport services, the airport AI server 130, instead of polling the smartphone 110 for airport services, may ask, at 330, whether the passenger desires any remote services. If the passenger indicates a need for remote services, such as restaurants, hotels, other remote service entities and event providers at the passenger's destination, the airport AI server 130 may query remote transaction server 140 and obtain via remote transaction services storage 142, information about the remote services needed by the passenger, for example, at the passenger's destination. The remote service information may be transmitted to the passenger by airport AI server 130 via messaging app 119, the passenger may select a remote service, and the AI server 130 in conjunction with remote transaction server 140 may provide the service via the remote service entity or remote event provider much the same as was done with the airport service entity in steps 340-380.

Figure 4:
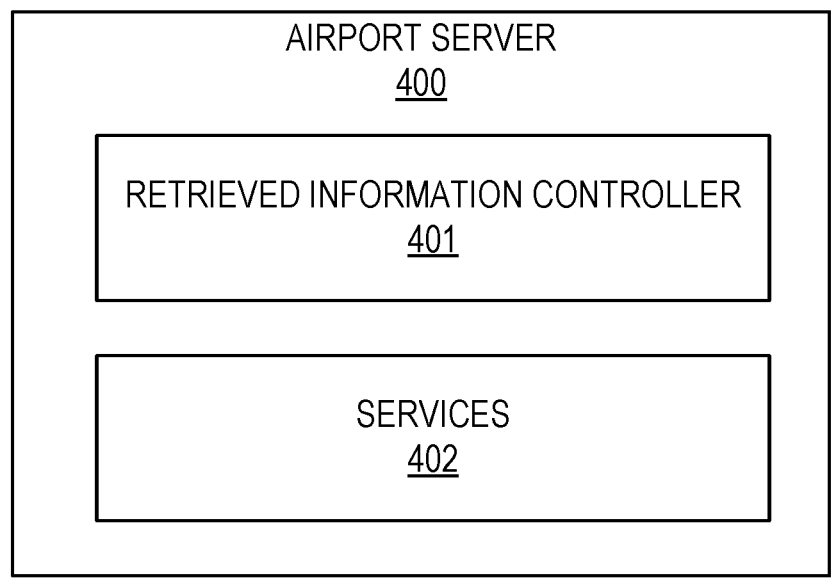
FIG. 4 is another diagram of another system for providing relevant information to smartphone users via interaction between passenger smartphone messaging apps and an airport AI server, according to an example embodiment.

FIG. 4 is a diagram of another system for providing relevant information to smartphone users via Interaction with passenger smartphone messaging apps and an airport AI server, according to an example embodiment.

The server 400 includes a variety of hardware components and software components. The software components of the server 400 are programmed and reside within memory and/or a non-transitory computer-readable medium and execute on one or more processors of the server 400. The server 400 communicates over one or more networks, which can be wired, wireless, or a combination of wired and wireless.

In an embodiment, the server 400 implements, inter alia, the processing described above with respect to FIGS. 1-3.

The server 400 includes retrieved information controller 401 and a services storage 402.

In an embodiment, the server 400 is the airport AI server 130.

In an embodiment, the server 400 is a logical collection of servers cooperating as a cloud.

In an embodiment, the services storage 402 is the airport services storage 133.

In an embodiment, the retrieved information manager 401 is all or some combination of: the network interface 131, airport AI storage 132, the method 200, and/or the method 300.

The retrieved information manager 401 is configured to: (i) record retrieved information and consents of a user airport AI storage 132 that is managed by the AI server 130, (ii) record consents provided by the user for selective access to information mobile device 110, (iii) provide a user-consent identifier that is specific to each mobile device 110, (iv) automatically connect with and track each mobile device 110, and (v) provide specific elements of information retrieved from a mobile device 110 to any of the airport services entities.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
   creating a communication link between a server and a messaging app in a smartphone when the smartphone is determined to be in a particular location at a first time;
   retrieving, via the communication link, information from memory of the smartphone, wherein the server is configured to use the retrieved information for providing service information to the smartphone via the messaging app, wherein retrieving further includes identifying product and service preferences from the information and updating the product and service preference for the smartphone, and wherein retrieving further includes obtaining the information as a browser history of the smartphone;
   flagging the browsing history with a flag and preventing other services from accessing the browsing history based on the flag;
   establishing second communication links between the server and the messaging app of the smartphone when the smartphone is determined to be in the particular location at second times; and
   retrieving a current browsing history from the smartphone for each second time as a new version of the information used for providing new service information to the smartphone via the messaging app and maintaining the flag with the current browsing history.

2. The method of claim 1 wherein use the retrieved information comprises accessing storage to retrieve the services information.

3. The method of claim 1 further comprising identifying the location of the smartphone and tracking the movement of the smartphone.

4. The method of claim 1, wherein the information from memory comprises personal information, the method further comprising the server receiving, via the messaging app, information that comprises user consent for retrieving the personal information from memory of the smartphone.

5. The method of claim 1 wherein the server comprises radio transmit/receive components, the smartphone is located in the airport, the communication link is over a local area network, and the retrieved information comprises identity of and flight information of the user of the smartphone.

6. The method of claim 5 wherein the service information comprises information identifying the passenger's airline, flight number, flight time, and gate of departure.

7. The method of claim 1 wherein creating the communication link comprises selecting a channel of the wireless local area network and establishing a connection to an interface of the messaging app.

8. The method of claim 7 wherein the local area network comprises a WiFi network.

9. A method comprising:
   polling a smartphone, by a server, via a messaging app in the smartphone when the smartphone is determined to be in a particular location at a first time;
   retrieving, pursuant to a response to the polling, information from memory of the smartphone, wherein retrieving further includes identifying product and service preferences from the information and updating the product and service preference for the smartphone, and wherein retrieving further includes obtaining the information as a browser history of the smartphone, providing, by the server, service information to the smart phone via the messaging app based at least in part on the product and service preferences;

flagging the browsing history with a flag and preventing other services from accessing the browsing history based on the flag;

re-polling the smartphone via the messaging app of the smartphone when the smartphone is determined to be in the particular location at second times; and retrieving a current browsing history from the smartphone for each second time as a new version of the information used for providing new service information to the smartphone via the messaging app and maintaining the flag with the current browsing history.

10. The method of claim 9 further comprising receiving a response to the polling and providing the service information based on the response to the polling.

11. The method of claim 9 wherein the smartphone is located at a location that includes a plurality of smartphones and the service information comprises information describing services offered by first service entities located at the location or information describing services offered by second service entities located remote from the location.

12. The method of claim 11 wherein the location is a passenger terminal, the method further comprising receiving from the smartphone, responsive to the service information, an order for a desired service to be provided by a first service entity located at the passenger terminal.

13. The method of claim 12 further comprising totaling the price of the desired service and providing information identifying the price to a graphical user interface of the smartphone via the messaging app.

14. The method of claim 13 further comprising receiving a payment for the desired service via the messaging app, and transmitting the order for the desired service to the first service entity, wherein a product of the service is available to the user of the smartphone when the user arrives at the first service entity.

15. The method of claim 11 further comprising:

receiving from the smartphone, via the messaging app and responsive to the service information, an order for a desired remote service to be provided by a second service entity;

totaling the price of the desired remote service; and providing information identifying the price of the desired remote service to a graphical user interface of the smartphone via the messaging app.

16. The method of claim 15 further comprising receiving a payment for the desired remote service via the messaging app, and transmitting an order for the desired remote service to the second service entity, wherein a product of the desired remote service is available to the user of the smartphone when the user arrives at the second service entity.

17. The method of claim 9 wherein polling the smartphone includes providing an opt-out selection.

18. A server, comprising:

a processor configured to execute executable instructions that represent an information provider for a plurality of smartphones that each includes a messaging app;

first storage configured as a database that stores information received from the plurality of smartphones; and second storage configured as a database that stores information concerning service entities situated locally to the plurality of smartphones, wherein the server is (i) coupled to a remote server that is configured to receive and send information to the processor from storage configured as a database that stores information concerning service entities situated remotely from the plurality of smartphones, (ii) configured to receive and send information over a wireless network from and to the plurality of smartphones via the messaging apps, and configured to retrieve browsing histories from the smartphones, identify product and service preferences from the browsing histories when the smartphones are determined to be in a particular location at first times, and update the product and service preferences for each smartphone, (iii) the information sent to the smartphones comprises services information regarding service entities situated locally to the smartphones and service entities situated remotely from the smartphones, wherein the information sent to the smartphones based at least in part on each smartphone's corresponding product and service preferences, (iv) flag the browsing histories with a flag and preventing other services from accessing the browsing histories based on the flag; (v) retrieve current browsing histories from the smartphones when the smartphones are determined to be in the particular location at second times as new versions of the information used for providing new service information to the smartphones and maintain the flag with the current browsing histories.

19. The server of claim 18, wherein the database of the first storage is secure and is configured to store personal information.

20. The server of claim 18, wherein the server is a collection of servers logically organized as a cloud processing environment.

* * * * *